US006898528B2

(12) United States Patent
Zorka et al.

(10) Patent No.: US 6,898,528 B2
(45) Date of Patent: May 24, 2005

(54) COLLISION AND INJURY MITIGATION SYSTEM USING FUZZY CLUSTER TRACKING

(75) Inventors: Nicholas Zorka, Clarkston, MI (US); Ka C. Cheok, Rochester Hills, MI (US); Manoharprasad K. Rao, Novi, MI (US); Edzko Smid, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/201,676

(22) Filed: Jul. 23, 2002

(65) Prior Publication Data

US 2004/0019425 A1 Jan. 29, 2004

(51) Int. Cl.$^{7}$ .......................... G06N 7/02; G06F 15/18

(52) U.S. Cl. .......................... 701/301; 701/45; 706/52; 180/271; 340/903

(58) Field of Search .......................... 180/730.2, 268, 180/283, 271, 273, 274, 282, 167, 169; 340/903; 382/111, 156; 342/52, 53, 54, 72, 60, 70, 71, 195; 701/301, 45; 706/57, 2, 46, 900, 905, 8; 280/735, 734, 728.1

(56) References Cited

U.S. PATENT DOCUMENTS

| | | | | | |
|---|---|---|---|---|---|
| 5,544,256 | A | * | 8/1996 | Brecher et al. | 382/149 |
| 5,748,852 | A | * | 5/1998 | Mahler | 706/52 |
| 5,835,901 | A | * | 11/1998 | Duvoisin et al. | 706/19 |
| 5,983,161 | A | | 11/1999 | Lemelson et al. | |
| 6,430,506 | B1 | * | 8/2002 | Mon et al. | 701/301 |
| 6,480,144 | B1 | * | 11/2002 | Miller et al. | 342/72 |
| 6,654,728 | B1 | * | 11/2003 | Li et al. | 706/2 |
| 6,662,092 | B2 | * | 12/2003 | Wang et al. | 701/45 |
| 6,746,043 | B2 | * | 6/2004 | Ishida | 280/735 |
| 2001/0047344 | A1 | * | 11/2001 | Basir et al. | 706/8 |
| 2002/0011722 | A1 | * | 1/2002 | Winkler et al. | 280/735 |
| 2003/0018592 | A1 | * | 1/2003 | Srinivasa et al. | 706/8 |
| 2003/0023362 | A1 | * | 1/2003 | Breed et al. | 701/45 |
| 2003/0023575 | A1 | * | 1/2003 | Shlain et al. | 706/52 |
| 2003/0083850 | A1 | * | 5/2003 | Schmidt et al. | 702/189 |
| 2003/0097212 | A1 | * | 5/2003 | Feser et al. | 701/45 |

FOREIGN PATENT DOCUMENTS

| | | | | |
|---|---|---|---|---|
| WO | WO 9830420 A1 | * | 7/1998 | B60R/21/32 |

* cited by examiner

*Primary Examiner*—Thomas G. Black
*Assistant Examiner*—Tuan C To
(74) *Attorney, Agent, or Firm*—Frank A. MacKenzie

(57) ABSTRACT

A collision and injury mitigation system (10) for an automotive vehicle (12) is provided. The system (10) includes two or more object detection sensors (15) that detect an object and generate one or more object detection signals. A controller (16) is electrically coupled to the two or more object detection sensors and performs a fuzzy logic technique to classify the object as a real object or a false object in response to the one or more object detection signals. A method for performing the same is also provided.

21 Claims, 4 Drawing Sheets

COLLISION AND INJURY MITIGATION SYSTEM USING FUZZY CLUSTER TRACKING

TECHNICAL FIELD

The present invention relates generally to collision and injury mitigation systems, and more particularly to a method and apparatus for classifying and assessing the threat of a detected object during operation of an automotive vehicle.

BACKGROUND OF THE INVENTION

Collision and injury mitigation systems (C&IMSs) are becoming more widely used. C&IMSs provide a vehicle operator and/or vehicle knowledge and awareness of objects within a close proximity so as to prevent colliding with those objects. C&IMSs are also helpful in mitigation of an injury to a vehicle occupant in the event of an unavoidable collision.

Several types of C&IMSs use millimeter wave radar or laser radar in measuring distance between a host vehicle and an object. Radar based C&IMSs transmit and receive signals from various objects including roadside clutter, within a close proximity, to a host vehicle.

C&IMSs discern, from acquired radar data, and report whether a detected object is a potential unsafe object or a potential safe object. Current C&IMSs are able to discern whether an object is a potential unsafe object or a potential safe object to some extent, but yet there still exists situations when objects are misclassified.

Four situations can arise with object recognition by radar based C&IMSs. The four situations are referred to as: a positive real threat situation, a negative real threat situation, a negative false threat situation, and a positive false threat situation.

A positive real threat situation refers to a situation when an unsafe and potential collision-causing object, such as a stopped vehicle directly in the path of a host vehicle exists and is correctly identified to be a threatening object. This accurate assessment is a highly desirable requirement and is vital to deployment of active safety countermeasures.

A negative real threat situation refers to a situation when an unsafe and potential collision-causing object exists, but is incorrectly identified as a non-threatening object. This erroneous assessment is a highly undesirable requirement as it renders the C&IMS ineffective.

A negative false threat situation refers to a situation when an unsafe object does not exist in actuality, and is correctly identified as a non-threatening object. This accurate assessment is a highly desirable requirement and is vital to non-deployment of active safety countermeasures.

A positive false threat situation refers to a situation when an unsafe object does not exist in actuality, but is incorrectly identified as a threatening object. For example, a stationary roadside object may be identified as a potentially collision causing object when in actuality it is a non-threatening object. Additionally, a small object may be in the path of the host vehicle and, although in actuality it is not a potential threat to the host vehicle, but is misclassified as a potentially unsafe object. This erroneous assessment is a highly undesirable requirement as it will be a nuisance to active safety countermeasures.

Accurate assessment of objects is desirable for deployment of active safety countermeasures. Erroneous assessment of objects may cause active safety countermeasures to perform or activate improperly and therefore render a C&IMS ineffective.

Additionally, C&IMSs may inadvertently generate false objects, which are sometimes referred to in the art as ghost objects. Ghost objects are objects that are detected by a C&IMS, which in actuality do not exist or are incorrectly generated by the C&IMS.

Many C&IMSs use triangulation to detect and classify objects. In using triangulation a C&IMS can potentially, in certain situations, artificially create ghost objects.

During triangulation multiple sensors are used to detect radar echoes returning from an object and determine ranges between the sensors and the object. Circular arcs are then created having centers located at the sensors and radius equal to the respective ranges to the object. Where the arcs from the multiple sensors intersect is where an object is assumed to be located.

Intersections of the arcs that are associated with the same detected object, yield location of real objects. Intersections of arcs associated with different detected objects produce ghost objects.

The number of ghost objects that may potentially be created is related to the amount of real objects detected. The following expression represents the approximate peak amount of ghost objects that may be created from real objects detected by a four sensor system using a triangulation technique:

$$G=6^*(R^\wedge 2-R) \quad 1$$

where R is the number of real objects and G is the number of false objects.

Sensor signals are noisy due to the nature of sensor properties. C&IMS that traditionally use direct sensor data, produce inaccurate triangulation intersections in response to the data. As a result, a suspected object location appears as a "spread-out" and moving conglomeration or cluster of intersections. This gives rise to inaccuracy in pinpointing the object. Accurate estimation and tracking of the cluster movement is vital to successful performance of a C&IMS.

Also, traditional C&IMSs by directly using sensor data from single or multiple sensors, can exhibit false measurements, due to items such as multiple paths, echoing, or misfiring of the sensors. These false measurements produce additional false objects and further increase difficulty in properly classifying objects.

An ongoing concern for safety engineers is to provide a safer automotive vehicle with increased collision and injury mitigation intelligence as to decrease the probability of a collision or an injury. Therefore, it would be desirable to provide an improved C&IMS that is able to better classify detected objects over traditional C&IMSs.

SUMMARY OF THE INVENTION

The foregoing and other advantages are provided by a method and apparatus for classifying and assessing the threat of a detected object during operation of an automotive vehicle. A Collision and Injury Mitigation System for an automotive vehicle is provided. The system includes two or more object detection sensors that detect an object and generate one or more object detection signals. A controller is electrically coupled to the two or more object detection sensors and performs a fuzzy logic technique to classify the object as a real object or a false object in response to the one or more object detection signals. A method for performing the same is also provided.

One of several advantages of the present invention is that it provides a Collision and Injury Mitigation System that minimizes the amount of false objects created. In so doing, increasing the accuracy of the Collision and Injury Mitigation System in classifying and assessing the potential threat of an object. Increased object detection accuracy allows the Collision and Injury Mitigation System to more accurately implement countermeasures as to prevent a collision or reduce potential injuries in the event of an unavoidable collision.

Another advantage of the present invention is that it combines a traditionally rigorous tracking algorithm with intelligent fuzzy clustering and fuzzy logic schemes to produce a reliable Collision and Injury Mitigation System resulting in a Collision and Injury Mitigation System with increased performance, reliability, and consistency.

Furthermore, the present invention by tracking temporal relationship of objects over time and assessing various parameters corresponding to object spatial relationship measurements accounts for false measurements, such as echoing or misfiring of object detection sensors.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION OF THE PREFERRED EMBODIMENT

Figure 1:
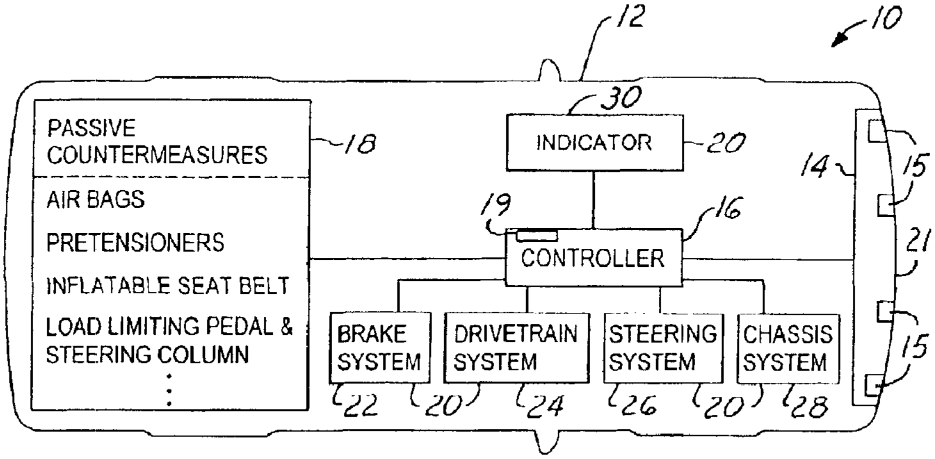
FIG. 1 is a block diagrammatic view of a Collision and Injury Mitigation System for an automotive vehicle using a fuzzy logic cluster tracking scheme in accordance with an embodiment of the present invention.

In each of the following figures, the same reference numerals are used to refer to the same components. While the present invention is described with respect to a method and apparatus for classifying a detected object, the present invention may be adapted to be used in various systems including: forward collision warning systems, collision avoidance systems, vehicle systems, or other systems that may require object classification.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated.

Additionally, the terms "classifying" and "classification" may refer to various object attributes, object parameters, object characteristics, object threat assessment levels, or other classifying descriptions known in the art to differentiate various types of detected objects. Classifying descriptions may include; whether an object is a real object or a false object, cluster characteristics of an object, magnitude of a reflected returned signal from an object, location of an object, distance between objects, object threat level, or other descriptions. For example, resulting magnitude of a radar reflected signal from an object may differentiate between a real object and a false object. Another example, a cluster for a real object may contain more detection points than a cluster for a false object.

Referring now to FIG. 1, a block diagrammatic view of a Collision and Injury Mitigation System 10 for an automotive vehicle 12 using a fuzzy logic cluster tracking scheme in accordance with an embodiment of the present invention is shown. The Collision and Injury Mitigation System 10 includes an object detection system 14, a controller 16, passive countermeasures 18, and active countermeasure systems 20. The object detection system 14 detects one or more objects within a close proximity of the vehicle 12, using object detection sensors 15 located at the front of the vehicle 21, and generates one or more object classification signals. The controller 16 uses triangulation techniques, fuzzy logic clustering techniques, and filtering to classify and assess the potential threat of the detected objects in response to the object detection signals. The controller 16 upon classifying and assessing the potential threat of the objects may activate or perform passive countermeasures 18 or active countermeasures 20, respectively.

The object detection system 14 may be as simple as a single motion sensor or may be as complex as a combination of multiple motion sensors, cameras, and transponders. The object detection system 14 may contain any of the above mentioned sensors and others such as pulsed radar, Doppler radar, laser, lidar, ultrasonic, telematic, or other sensors known in the art. In a preferred embodiment of the present invention the object detection system has multiple object detection sensors 15, each of which being capable of acquiring data related to range between an object detection sensor and an object, magnitude of echoes from the object, and range rate of the object.

The controller 16 is preferably microprocessor based such as a computer having a central processing unit, memory (RAM and/or ROM), and associated input and output buses. The controller 16 may be a portion of a central vehicle main control unit, an interactive vehicle dynamics module, a restraints control module, a main safety controller, or a stand-alone controller. The controller 16 includes a Kalman filter-based tracker 19 or similar device known in the art, which is further described below.

Passive countermeasures 18 are signaled via the controller 16. The passive countermeasures 18 may include internal airbags, inflatable seatbelts, knee bolsters, head restraints, load limiting pedals, a load limiting steering column, pretensioners, external airbags, and pedestrian protection devices. Pretensioners may include pyrotechnic and motorized seat belt pretensioners. Airbags may include front, side, curtain, hood, dash, or other types of airbags known in the art. Pedestrian protection devices may include a deployable vehicle hood, a bumper system, or other pedestrian protective device.

Active countermeasure systems 20 include a brake system 22, a drivetrain system 24, a steering system 26, a chassis system 28, and other active countermeasure systems. The controller 16 in response to the object classification and threat assessment signals performs one or more of the active countermeasure systems 20, as needed, to prevent a collision or an injury. The controller 16 may also operate the vehicle 12 using the active countermeasure systems 20. The active countermeasures 20 may also include an indicator 30.

Indicator 30 generates a collision-warning signal in response to the object classification and threat assessment, which is indicated to the vehicle operator and others. The operator in response to the warning signal may then actively perform appropriate actions to avoid a potential collision. The indicator 30 may include a video system, an audio system, an LED, a light, global positioning system, a heads-up display, a headlight, a taillight, a display system, a telematic system or other indicator. The indicator 30 may supply warning signals, collision-related information, external-warning signals or other pre and post collision information to objects or pedestrians located outside of the vehicle 12.

Figure 2:
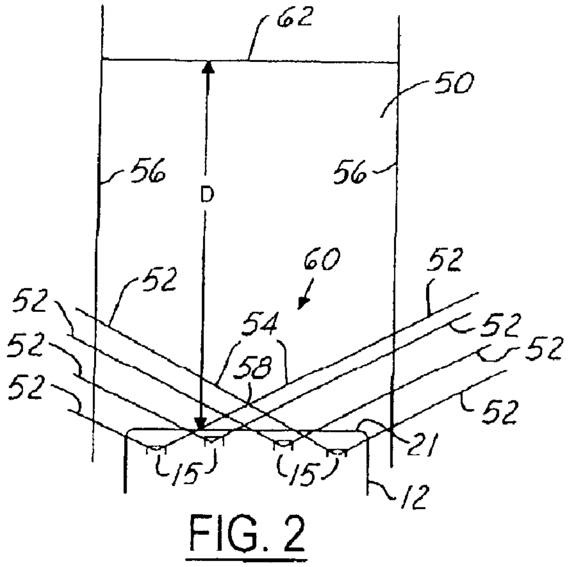
FIG. 2 is a top view of object detection system 14 illustrating an example of a range gate field of detection area in accordance with an embodiment of the present invention.

Referring now to FIG. 2, a top view of object detection system 14 illustrating an example of a range gate field of detection area 50 in accordance with an embodiment of the present invention is shown. Each object detection sensor 15 has a corresponding field of view 52, in which objects may be detected. Overlapping of the field of views for each object detection sensor creates a common field of view 54. The controller 16 in classifying objects focuses the common field of view 54 down to detection area 50. The detection area 50 is defined by two opposing predetermined parallel lines on two sides 56, which are parallel to the direction of travel of the vehicle 12, a vertex 58 of the common field of view 54 on a third side 60, and a predetermined set distance D from the vehicle 12 creating a fourth side 62. Objects outside the detection area 50 are considered not a potential threat. Objects within the detection area 50 are further assessed to determine whether they are a potential threat. Other range gate field of view detection areas, having different size and shape may be used.

Figure 3:
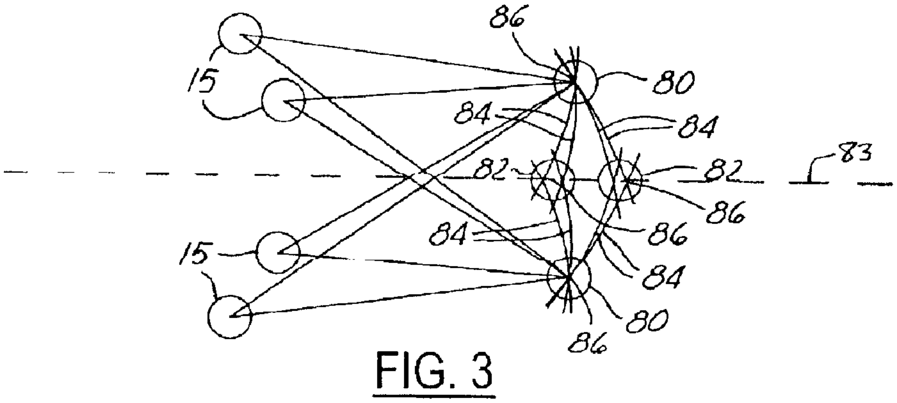
FIG. 3 is a bubble plot illustrating a detection example of two real objects and two false objects in accordance with an embodiment of the present invention.

Referring now to FIG. 3, a bubble plot illustrating a detection example of two real objects 80 and two false objects 82 in accordance with an embodiment of the present invention is shown. When the two detected real objects are equal distance from the vehicle 12 on either side of the vehicle centerline 83, as shown, multiple false objects may be detected. An arc 84 is created, for each object detection sensor and detected object, by sweeping an object detection point 80 about a corresponding object detection sensor 15. Where arcs 84 intersect the controller detects an object located at a point of intersection 86. So a real detected object 80 may have up to six intersections in a zone defining the object, as opposed to a false object 82, which may have fewer, for example, one or two intersections in the zone defining the object.

The false objects 82 may be eliminated by the use of fuzzy logic and filtering. During the performance of fuzzy logic, intersection points 86 are clustered into weighted groups to distinguish real objects 80 from false objects 82.

Figure 4:
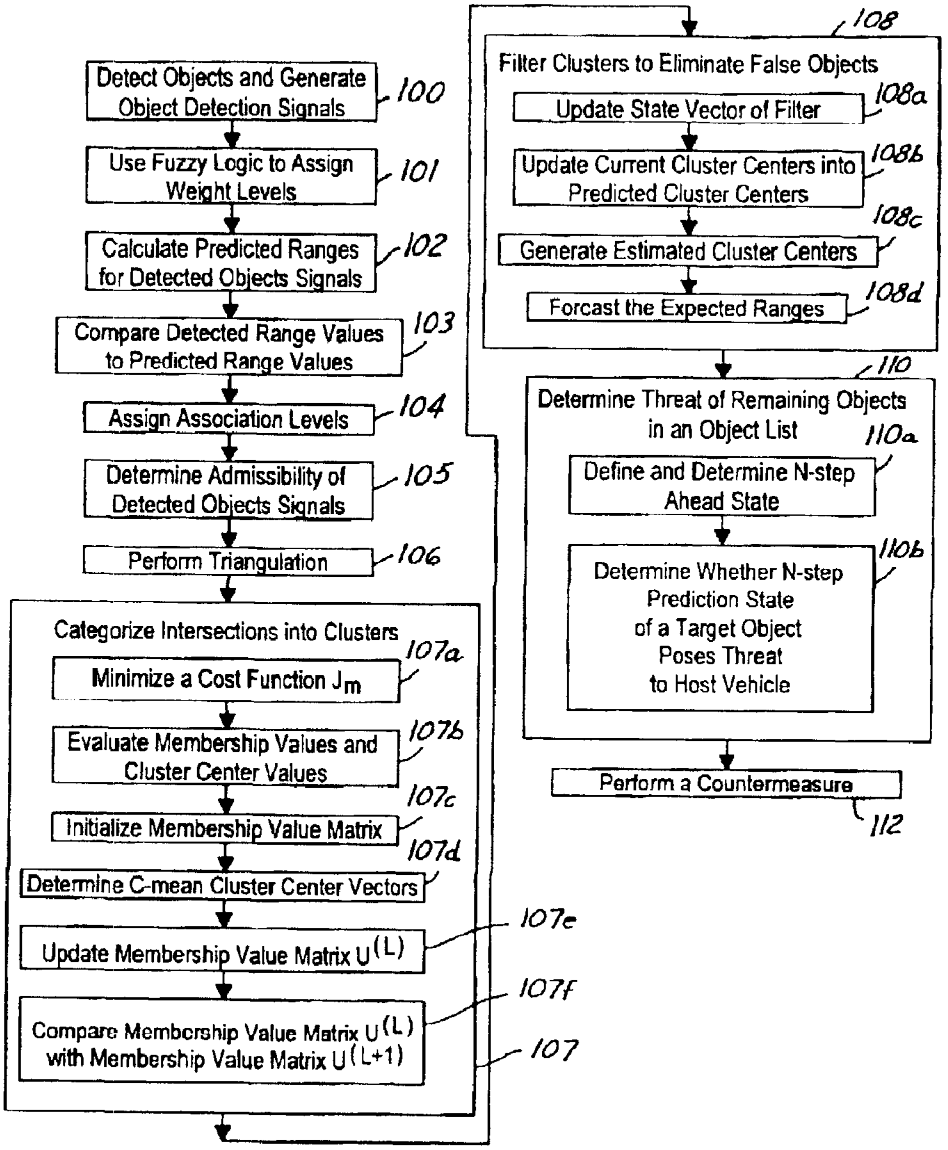
FIG. 4 is a flow diagram illustrating a method of classifying an object by the Collision and Injury Mitigation System in accordance with an embodiment of the present invention.

Referring now to FIG. 4, a flow diagram illustrating a method of classifying an object by the Collision and Injury Mitigation System 10 in accordance with an embodiment of the present invention is shown.

In step 100, the object detection system 14 generates object detection signals corresponding to detected objects and include range, magnitude, and range rate of the detected objects. The controller 16 collects multiple data points from the object detection system 14 corresponding to one or more of the detected objects.

In step 101, a fuzzy logic reasoning technique is used to assign high weight levels to object detection signals having sufficiently large magnitude and reasonable range rate, signifying that echoes returned from detected objects warrant analysis and signifying that the detected objects are moving at a realistic rate that is physically possible, respectively. Object detection signals with high weight level are regarded reliable measurements, which are utilized for further analysis.

Similarly, low weight levels are assigned to object detection signals having magnitude that is sufficiently small and having range rate that is sufficiently high, signifying possibly noise or echo from an object that is not of sufficient strength to warrant analysis at a current time and range rate that is significantly high such that measurement signals are not consistent with those of a real object, respectively. Object detection signals with low weight levels are regarded as noise and hence not utilized for further analysis.

In step 102, the approximate predicted values of ranges are determined. The predicted ranges, denoted as $r_{j,predict}$, $j=1, \ldots, n_t$, $n_t$ being the number of object targets being tracked, are calculated by the dynamical filter-based tracker 19 using the algorithm described in step 108.

In step 103, the ranges associated with each of the object detection signals are compared to the predicted ranges.

In step 104, fuzzy logic is used to assign association levels to signals whose range value is close to that of a predicted range. An example of fuzzy logic rules that may be used is when range value minus predicted range value for a particular object is small, then a corresponding association level is high. When range value minus predicted range value for a particular object is large, then a corresponding association level is low. The predicted range value is the predicted estimate of ranges computed by a bank of Kalman filter-based trackers contained within the Kalman filter-based tracker 19, which are explained below. From the weight levels and association levels, the controller 16 designates object detection signals as having admissible or inadmissible ranges.

In step 105, the controller 16 determines the admissibility of the detected signals. Controller 16 monitors the magnitude of the object detection signals, and the range between the detected objects and the vehicle 12 to assess the threat of the detected objects. When the magnitude is below predetermined values the detected object is considered not to be a potential threat and does not continue assessing that object.

In step 106, using admissible ranges as arcs, a triangulation procedure is applied to obtain intersections. The multitude of admissible ranges produces a multitude of intersections.

The controller 16 distinguishes admissible range values using another set of fuzzy logic rules. For example, when association level is high and weight value is high then the range value is admissible. When association level is low or weight is low then range value is inadmissible. Using the admissible ranges, the controller 16 generates multiple arc intersections using triangulation as described above. During triangulation the controller 16 employs a cosine rule given by:

$$\alpha = \cos^{-1}\left(\frac{b^2 + c^2 - a^2}{2bc}\right) \quad (2)$$

where a and b are admissible range values from two object detection sensors, and c is a distance between the two object detection sensors. A condition a<b+c or h<a+c is satisfied in order for the triangulation to be successfully completed.

Triangulations of the arcs produces intersections, which are then expressed in Cartesian coordinates as vectors, shown in equation 3.

$$p_j = \begin{bmatrix} p_x \\ p_y \end{bmatrix}_j, \; j = 1, \ldots, n \quad (3)$$

In equation 3, $p_x$ and $p_y$ are, respectively, the lateral and longitudinal coordinates of the intersections with respect to a coordinate system of the vehicle; and n is the number of intersections.

Due to inherent measurement inaccuracies, the arc intersections, $p_j$, j=1, . . . , n, appear as scattered points that may congregate around positions of both real objects and false objects, which may not be clearly distinguishable at a particular moment in time.

In step 107, the controller 16 performs a fuzzy logic technique on said object database to categorize intersections into clusters 89. The fuzzy clustering technique may be a C-mean or a Gustafson-Kessel technique, as known in the art. Each cluster 89 contains multiple intersection points 86. Each intersection point 86 is weighted for each cluster 89 to determine membership of each intersection point 86 to each cluster 89. The fuzzy logic technique yields cluster centers with corresponding coordinates and spread patterns of each cluster. Spread pattern referring to a portion of an object layout 90 corresponding to a particular cluster.

In steps 107*a–f* an example of a fuzzy clustering technique based on a fuzzy C-mean clustering method is described.

In step 107*a*, the method specifies the function $J_m$ is the cost to be minimized, where $J_m$ may be represented by equation 4.

$$J_m(U, V) = \sum_{j=1}^{n} \sum_{i=1}^{d} (u_{ij})^m \|p_j - v_i\|^2 \quad (4)$$

Cost function $J_m$ represents the degree of spread pattern of intersections, where m∈[2, 3, . . . ∞) is a weighting constant, d is the number of cluster centers and the symbols, || ||, denotes the norm of the vector. Cost function $J_m$ is a sum of distances from the intersections 86, represented by $p_j$, to the cluster centers $v_i$, weighted by membership values of each intersection $u_{ij}$. The membership values of each intersection to all centers sum up to unity, that is $$\sum_{i=1}^{d} u_{i,j} = 1 \quad (5)$$

In step 107*b*, the membership values and cluster center values are set to satisfy equation 6 and equation 7, respectively.

$$u_{ij} = \frac{1}{\sum_{k=1}^{d} \left(\frac{\|p_j - v_i\|}{\|p_j - v_k\|}\right)^{\frac{2}{m-1}}}, \; i = 1, \ldots, d, \; j = 1, \ldots, n \quad (6)$$

$$v_i = \frac{\sum_{j=1}^{n} (u_{ij})^m p_j}{\sum_{j=1}^{n} (u_{ij})^m}, \; i = 1, \ldots, d \quad (7)$$

Equation 6 expresses the membership or association value of the j-th object detection point to the i-th cluster. Equation 7 expresses the center of the i-th clusters.

The fuzzy C-mean clustering algorithm uses the above two necessary conditions and the following iterative computational steps 107*c–f* to converge to clustering centers and membership functions.

In step 107*c*, the controller 16 using a known value n of intersection points $p_j$, j=1, . . . , n, and a constant number of cluster centers d, where 2≦d≦n and initializes a membership value matrix U as:

$$U^{(0)} = \{u_{i,j}^{(0)}\} = \begin{bmatrix} u_{1,1}^{(0)} & u_{1,2}^{(0)} & \cdots & u_{1,n}^{(0)} \\ \vdots & & & \vdots \\ u_{d,1}^{(0)} & u_{d,2}^{(0)} & \cdots & u_{d,n}^{(0)} \end{bmatrix} u_{i,j}^{(0)} \in [0, 1] \quad (8)$$

where the superscript (0) signifies the zero-th or initialization loop. The values for the initial matrix in equation 8 may be assigned arbitrarily or my some other method such as using values from a previous update. At this stage, the controller also sets a looping index l to zero; i.e., l=0.

In step 107*d*, for i=1, . . . , d, the controller 16 determines C-mean cluster center vectors $v_i^{(l)}$ as follows:

$$v_i^{(l)} = \frac{\sum_{j=1}^{N} \left(u_{i,j}^{(l)}\right)^m p_j}{\sum_{j=1}^{N} \left(u_{i,j}^{(l)}\right)^m} \quad (9)$$

In step 107*e*, membership value matrix $U^{(l)}$ is updated to a next membership value matrix $U^{(l+1)}$ using $$u_{ij}^{(l+1)} = \frac{1}{\sum_{k=1}^{d} \left(\frac{\|p_j - v_i\|}{\|p_j - v_k\|}\right)^{\frac{2}{m-1}}}, \; i = 1, \ldots, d, \; j = 1, \ldots, n \quad (10)$$

In step 107*f*, membership value matrix $U^{(l)}$ is compared with updated membership value matrix $U^{(l+1)}$. When $\|U^{(l+1)} - U^{(l)}\| < \epsilon$, for a small constant ϵ, perform step 108, otherwise set l=l+1 and perform step 107*d*.

Upon exiting from step 107*f*, the main results from fuzzy C-mean clustering algorithm are cluster centers, which are position vectors with x and y components of the form $$v_i = \begin{bmatrix} v_x \\ v_y \end{bmatrix}_i,$$

where i=1, . . . , d.

In step 108, cluster center positions are compared to a set of predicted cluster center positions produced by the dynamic filter-based tracker 19. Based on differences between cluster centers and predicted positions, the controller 16 uses fuzzy logic to determine whether the cluster centers are close to a predicted center and agree with trend of displacement of estimated centers or far from predicted center or disagree with trend of displacement.

One-step prediction state vectors, denoted by $X_{j,k|k-1}$, j=1, . . . , $n_t$, are generated by the dynamical filter-based tracker 19, where $n_t$ is the number of target objects being tracked. The integer index, k, indicates the count for the sample iteration loops performed by the tracker 19. Hence when τ is the constant time period between iterations, then kτ is the clock time for the algorithm. The subscript k/k−1 indicates the one-step prediction for iteration k, made using only information available up till iteration k−1.

The components of state vector $x_{j,k|k-1}$ consist of predicted estimates of position, speed and acceleration of the j-th target object being tracked. An example of what the state vector array is $x_{j,k|k-1}=[\hat{p}_x\ \hat{\dot{p}}_x\ \hat{\ddot{p}}_x\ \hat{p}_y\ \hat{\dot{p}}_y\ \hat{\ddot{p}}_y\ ]_{j,k|k-1}{}^t$ where $\hat{p}_x\ \hat{\dot{p}}_x$ & $\hat{\ddot{p}}_x$ and $\hat{p}_y\ \hat{\dot{p}}_y$ & $\hat{\ddot{p}}_y$ denote estimated position, speed and acceleration in the x and y directions, respectively.

The controller 16 then compares each of the cluster centers, $v_i$, i=1, . . . , d, to the position component of $\hat{x}_{j,k|k-1}$, using the following fuzzy logic rules. When $$\|v_i - \hat{x}_{j,k|k-1}^{pos}\|$$

is small, i & j values are stored and when $$\|v_i - \hat{x}_{j,k|k-1}^{pos}\|$$

is large, values of i & j are not stored. $\hat{x}_{j,k|k-1}{}^{pos}$ is the position component of the state and is equal to $[\hat{p}_x\ \hat{p}_y]_{j,k|k-1}{}^T$.

In step 108, the controller 16 filters the clusters to remove or eliminate false objects. An example of a type and style of filter that may be used is a Kalman filter. Controller 16 determines the probability that a cluster represents a real object in response to the weighted clusters and generates an object list. In steps 108*a–c* a tracking algorithm is performed.

In step 108*a*, the tracker 19 determines which cluster centers correspond with real objects and updates the state vector of the object filter, while it ignores the cluster centers corresponding to false objects. The resultant updates are referred to as estimated filter states, and include information on position, speed and acceleration of the object being tracked.

In step 108*b*, the tracker 19 then uses dynamics equations that describe displacement and velocity and trend of the clusters to further update current cluster centers into predicted cluster centers. Both the estimated and predicted cluster centers remain steady until the next sensor update after which step 108*a* iterates.

In step 108*c*, the tracker 19, supervised by the controller 16 using the fuzzy clustering and fuzzy logic techniques, generates estimated cluster centers that closely follow the dynamic movement of the clusters.

The following is a preferred method used to perform steps 108*a–c*. The controller 16 using the stored pair {i, j}, updates equations for a j-th Kalman filter-based tracker. Equations for the j-th Kalman filter-based tracker are given by an algorithm using equations 11–15:

$$\hat{x}_{j,k|k}=\hat{x}_{j,k|k-1}+K_{j,k}[v_i-C\hat{x}_{j,k|k-1}] \quad 11$$

$$\hat{x}_{j,k+1|k}=A\hat{x}_{j,k|k} \quad 12$$

where matrices A and C represent the suspected tracking dynamics and observation behavior, respectively, of the object movement. The filter gain matrix $K_{j,k}$ is computed from:

$$K_{i,k}=P_{j,k|k-1}C'[CP_{j,k|k-1}C'+R_{j,k}]^{-1} \quad 13$$

where $P_{k/k-1}$ is a covariance matrix and is computed from equations 14 and 15.

$$P_{j,k|k}=[I-K_{j,k}C]P_{j,k|k-1} \quad 14$$

$$P_{j,k+1|k}=AP_{j,k|k}A'+Q_{j,k} \quad 15$$

$Q_{j,k}$ & $R_{j,k}$ are weight matrices that can be interpreted as covariance of random state perturbations and random measurement noise, respectively. The values of these matrices determines the performance of dynamical filters.

The initial conditions for the tracker 19 are initial estimations or may be random values, where $\hat{x}_{0|-1}$ in equation 11 is equal to an initial guess vector and $P_{0|-1}$ in equation 13 is greater than zero and is a positive-definite matrix.

In step 108*d* calculations are performed to forecast the expected ranges for the upcoming object to be detected by the sensor using equation 16.

$$r_{j,predict}=\sqrt{(\hat{p}_{x,j,k+1/k})^2+(\hat{p}_{y,j,k+1/k})^2} \quad 16$$

where the forecasted positions $x_{j,k+1/k}=[\hat{p}_{x,j,k+1/k}\ \hat{p}_{y,j,k+1/k}]^T$ for the j-th target come from equation 12.

In step 110, the object list contains only real objects that may or may not be a potential threat. The controller 16 does a final assessment combining various object attributes and parameters to determine threat of the remaining objects in the object list. Range data of target objects is processed using fuzzy logic, fuzzy clustering, dynamical filter tracking and prediction techniques to perceive potential collision-causing objects and indicate a danger level through a Collision Warning Index (CWI). Forecast positions are evaluated to yield a CWI that indicates whether detected objects, represented by estimated cluster centers, present potential collision threats.

The CWI is computed by predicting future state position, speed, and acceleration of the target objects, and evaluating whether the target objects may collide with the host vehicle 12. The CWI provides an indication of a predicted danger level.

In step 110*a*, an N-step ahead state is defined as $x_{j,k+N|k}$, for N greater than zero. The subscript (k+N)|k signifies that an N-step prediction at time (k+N)τ is computed using only information available up till time kτ. The N-step ahead state $x_{j,k+N|k}=[\hat{p}_x\ \hat{\dot{p}}_x\ \hat{\ddot{p}}_x\ \hat{p}_y\ \hat{\dot{p}}_y\ \hat{\ddot{p}}_y]_{j,k+N|k}{}^T$ represents the estimated future position, speed and acceleration of the j-th target object being tracked.

The N-step prediction calculation is based on the dynamic behavior perceived of the object movement as shown below:

$$\hat{x}_{j,k+N|k}=A^N\hat{x}_{j,k|k},\ j=1, \ldots, n_t \quad 17$$

In step 110*b*, another set of fuzzy logic is employed to evaluate whether the N-step prediction state, corresponding to a target object, poses a potential danger to the host vehicle 12. For example, a partial logic for issuing a CWI is as follows. When a target object position $\hat{x}_{j,k+N|k}^{pos}$ is within a predetermined distance of the host vehicle 12 and the target object speed $\hat{x}_{j,k+N|k}^{spd}$ is equal to zero, then CWI is in an alert state. When a target object position $\hat{x}_{j,k+N|k}^{pos}$ is within a predetermined distance of the host vehicle 12 and the target object speed $\hat{x}_{j,k+N|k}^{spd}$ is equal to a large negative value, then CWI is in a warning state, where $$\hat{x}^{pos}_{j,k+N|k} = [\hat{p}_x \;\; \hat{p}_y]^T_{j,k+N|k}$$

and $$\hat{x}^{spd}_{j,k+N|k} = \left[\hat{\dot{p}}_x \;\; \hat{\dot{p}}_y\right]^T_{j,k+N|k}.$$

For other possible values of target object position $\hat{x}_{j,k+N|k}^{pos}$ and target object speed $\hat{x}_{j,k+N|k}^{spd}$ the CWI is in a normal state.

In step 112, the controller 16 in response to the final assessment determines whether to activate a countermeasure and to what extent to activate the countermeasure. The CWI may be used to activate the countermeasures 18 and 20 for improving safety of the host vehicle 12.

The above-described steps are meant to be an illustrative example, the steps may be performed synchronously or in a different order depending upon the application.

Figure 5:
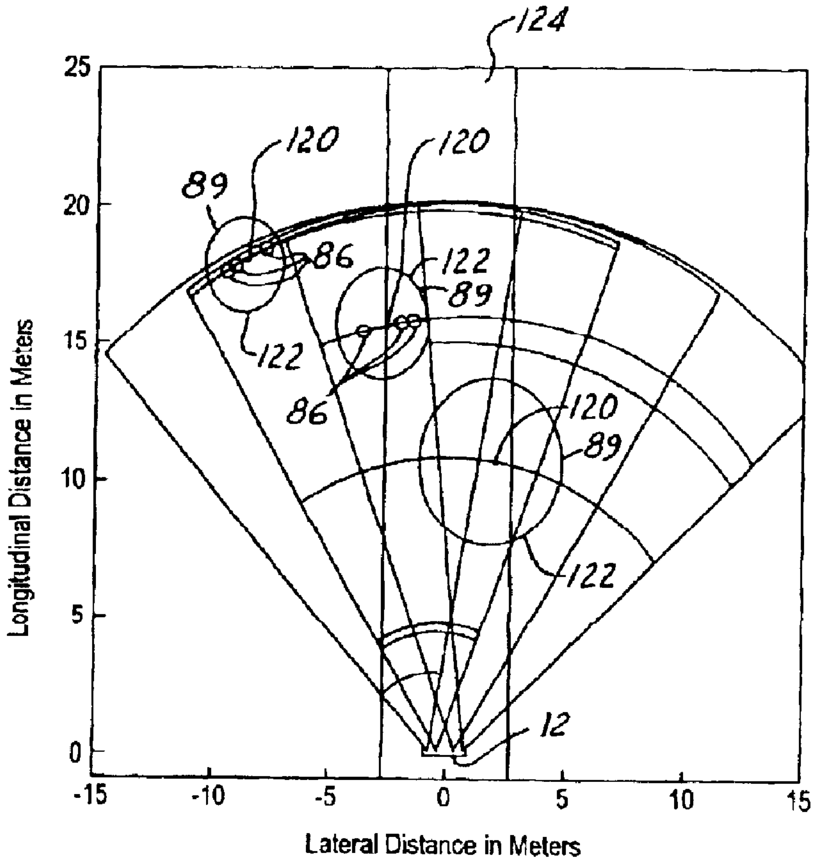
FIG. 5 is a graph illustrating a fuzzy cluster tracking technique in accordance with an embodiment of the present invention.

Referring now to FIG. 5, a graph illustrating a fuzzy cluster tracking technique in accordance with an embodiment of the present invention is shown. A "snapshot" is shown during a fuzzy cluster tracking technique illustrating object tracking. Circle centers 120 represents positions of an object being tracked by the dynamic filters given by equation 11. Size of the circles 122 indicate how closely data points are related to each other. A larger circle represents the data points being more closely clustered, and hence, more likely to represent a real object than the smaller circles. Center area 124 corresponds with the detection area 50 in FIG. 2.

The present invention provides a Collision and Injury Mitigation System with improved object classification techniques. The present invention in using a fuzzy C-mean clustering technique in addition to filtering provides a Collision and Injury Mitigation System with enhanced accuracy in determining whether an object is a real object or a false object. The object classification techniques allow the Collision and Injury Mitigation System to better predict and assess a potential threat of an object as to better prevent a collision or an injury.

The present invention by using fuzzy logic techniques discriminates sensor signals as admissible or inadmissible by evaluating values of range, magnitude and range rate using decision rules, providing a Collision and Injury Mitigation System with improved reasoning ability. Also, the present invention by using a fuzzy clustering technique analyzes coordinate positions of multiple intersections, groups the intersections into clusters, pinpoints the center of the clusters and assigns membership values to categorize the extent of spread patterns of each cluster. In so doing, provides a vehicle controller a means to visualize clusters of objects, perceive cluster centers, and determine spread patterns of the objects. By applying filtering techniques and decision rules to the clustering data, the present invention improves the reliability and confidence levels of object tracking and threat assessment.

The above-described apparatus, to one skilled in the art, is capable of being adapted for various purposes and is not limited to the following systems: forward collision warning systems, collision avoidance systems, vehicle systems, or other systems that may require object classification. The above-described invention may also be varied without deviating from the spirit and scope of the invention as contemplated by the following claims.

What is claimed is:

1. A collision and injury mitigation system for an automotive vehicle comprising:

two or more object detection sensors detecting an object and generating one or more object detection signals; and a controller electrically coupled to said two or more object detection sensors performing a fuzzy logic technique to classify said object as a real object or a false object in response to said one or more object detection signals.

2. A system as in claim 1 wherein performing a fuzzy logic to classify said object comprises performing a clustering method.

3. A system as in claim 1 further comprises said controller using triangulation in combination with said fuzzy logic to classify said object.

4. A system as in claim 1 further comprising a filter to track said object relative to the vehicle or an object other than the vehicle.

5. A system as in claim 4 wherein said filter is a Kalman filter.

6. A system as in claim 1 wherein said controller in classifying said object determines velocity of said object relative to the vehicle or an object other than the vehicle.

7. A system as in claim 1 wherein said controller in classifying said object determines direction of travel of said object relative to the vehicle or an object other than the vehicle.

8. A system as in claim 1 wherein said controller in classifying said object predicts velocity of said object relative to the vehicle or an object other than the vehicle.

9. A system as in claim 1 wherein said controller in classifying said object predicts direction of travel of said object relative to the vehicle or an object other than the vehicle.

10. A system as in claim 1 wherein said controller in classifying said object utilizes magnitude of said one or more object detection signals.

11. A system as in claim 1 further comprising:

a countermeasure electrically coupled to said controller;

said controller activating said countermeasure in response to said object classification.

12. A system as in claim 1 wherein said controller assesses the threat of said object in response to said object classification.

13. A method of classifying an object by a collision and injury mitigation system for an automotive vehicle comprising:

detecting an object and generating one or more object detection signals; and performing a fuzzy logic technique to classify said detected object as a real object or a false object in response to said one or more object detection signals.

14. A method as in claim 13 further comprising assessing the threat of said one or more objects in response to said object classification.

15. A method as in claim 13 further comprising filtering said one or more object detection signals to track said object.

16. A method as in claim 13 further comprises filtering said one or more object detection signals to predict the future path of said object.

17. A method as in claim 13 wherein said clustering method comprises using at least one of the following: amplitude information, range rate information, or range information.

18. A method of classifying an object by a collision and injury mitigation system for an automotive vehicle comprising:

detecting one or more objects and generating one or more object detection signals;

performing a triangulation technique on said object detection signals and generating an object detection database;

performing a fuzzy logic clustering technique on said object detection database and generating clusters;

filtering said clusters to remove false objects from said object detection database and generating an real object list; and classifying objects in said real object list.

19. A method as in claim 18 further comprising determining admissibility of said object detection signals.

20. A method as in claim 18 further comprising assessing the threat of an object in said real object list.

21. A collision and injury mitigation system for an automotive vehicle comprising:

two or more object detection sensors detecting an object and generating one or more object detection signals;

a countermeasure; and a controller electrically coupled to said two or more object detection sensors performing a triangulation technique and a fuzzy logic technique to generate clusters and filtering said clusters to classify said object as a real object or a false object in response to said one or more object detection signals, said controller activating said countermeasure in response to said object classification.

* * * * *